United States Patent
Anfossi et al.

[11] Patent Number: 5,982,392
[45] Date of Patent: Nov. 9, 1999

[54] REPLICATING AND REFRESHING GRAPHIC IMAGES ON A REMOTE WORKSTATION

[75] Inventors: Agostino Anfossi; Luca Loiodice; Antonio Perrone, all of Rome, Italy

[73] Assignee: International Business Machines Corporation, Armonk, N.Y.

[21] Appl. No.: 08/932,858

[22] Filed: Sep. 23, 1997

[30] Foreign Application Priority Data

Sep. 24, 1996 [GB] United Kingdom .................. 9620019

[51] Int. Cl.[6] .................................................... G06F 15/16
[52] U.S. Cl. ............................... 345/502; 345/2; 709/246
[58] Field of Search .................................. 345/329–332, 345/501, 502, 507, 1, 2, 965, 969, 971; 395/200.3, 200.38–200.41, 200.47, 200.48, 200.6–200.62, 200.68, 200.72, 200.76, 726; 709/200, 208–211, 217–219, 230–232, 238, 246, 301

[56] References Cited

U.S. PATENT DOCUMENTS

| | | |
|---|---|---|
| 4,414,621 | 11/1983 | Bown et al. .............................. 345/329 |
| 4,897,799 | 1/1990 | Le Gall et al. ...................... 395/200.76 |
| 5,241,625 | 8/1993 | Epard et al. .............................. 345/502 |
| 5,491,780 | 2/1996 | Fyles et al. .............................. 345/332 |
| 5,608,426 | 3/1997 | Hester ..................... 345/153 |
| 5,687,376 | 11/1997 | Celi, Jr. et al. ......................... 395/704 |
| 5,704,042 | 12/1997 | Hester et al. ...................... 395/200.34 |
| 5,734,871 | 3/1998 | Kleinerman et al. .................... 395/500 |
| 5,774,720 | 6/1998 | Borgendale et al. .................... 395/682 |

FOREIGN PATENT DOCUMENTS

645695A1 9/1994 European Pat. Off. .......... G06F 3/14

*Primary Examiner*—U. Chauhan
*Attorney, Agent, or Firm*—Jeanine S. Ray-Yarletts

[57] ABSTRACT

A method and system for remote control of a target computer by a controller computer through a network. The graphic commands issued by the graphic engine of the target computer are "hooked" and translated into a system independent format. The translated commands are then transmitted to the controller computer to be replayed on the display. The independency from the operating system is realized by defining a protocol which is used to translate a subset of the graphic commands in the target computer before the transmission to the controller computer where the commands are re-translated according to the same protocol.

4 Claims, 4 Drawing Sheets

REPLICATING AND REFRESHING GRAPHIC IMAGES ON A REMOTE WORKSTATION

TECHNICAL FIELD

The present invention relates to remote control systems and particularly to a system and method for duplicating the screen image of a source data processing system on a screen of a destination system.

BACKGROUND OF THE INVENTION

Remote control programs are a special category of communication applications. They go beyond just connecting a computer with another computer to actually taking control of it. By connecting through phone lines and modems or through LAN connections, these programs can put all the resources of one data processing system (e.g. a personal computer or a workstation), usually called the target, under the complete control of another data processing system (e.g. a personal computer or a workstation, connected with a LAN), usually called the controller. The controller screen duplicates the target one. The keyboard of the controller can enter characters directly on the target data processing system; the mouse of the controller can move the mouse pointer on the target screen. The controller screen constantly receives data from the target data processing system screen. Likewise, the keyboard of the controller sends data to the target data processing system every time a key is hit. For all practical purposes, the controller user may as well be sitting in front of the target data processing system.

This kind of remote control software can be useful in a number of circumstances. Just as an example an office personal computer system can be controlled and operated from home personal computers. If the office PC is left connected to a modem, the control can be taken from the home PC and all the resources of the target PC can be controlled and used remotely. A more specific use is to dial in (via modem) to a network-connected PC at the office, log in, and run network applications or update shared files on the network.

The bottleneck caused by modems can have a significant effect on the speed of remote control operations. To boost performances, remote control programs try to reduce and minimize the amount of data that needs to be transmitted over the communication lines (LAN or telephone cables). The refresh of the video image on the display screen of the target PC, which should be duplicated on the controller PC, constitutes the main point in the transmission speed, due to the big quantity of information which has to be transferred. In the past, remote control programs worked by sending and refreshing the entire image of the target PC screen to the remote PC every fraction of a second. The constant rate at which the screen images were sent to the controller PC was called the screen refresh rate. The controller PC screen accurately reflected the target PC screen as changes at the target PC would be included in the next screen refresh. This approach was, of course, not very satisfactory in term of speed, because of the enormous amount of data to be transmitted at each refresh.

Often, a change of the image is limited to a small section of the screen (e.g. moving the mouse pointer, pulling down a menu, highlighting an object) and only the changed data need to be refreshed. The controller system can use the screen data previously received and just refresh the modified part of the screen. By cutting out redundant screen refresh data, a remote control program can improve the response time. Cache memories speed the performance of hard drives and memory chips, and can also be useful for remote control programs. The idea behind a cache is to keep recently used data in a temporary storage area that is quickly accessible. If the data are soon needed again, it is much quicker to access them from a fast-access temporary storage area than to retrieve from the original source. According to this technique, elements of a recently displayed screen are saved as a cache in extended memory. The entire page redraws from the controller PC screen cache, eliminating the need to transfer large amounts of information over the modem from the target to the controller PC. Screen elements that are often redrawn from a screen cache include bit maps, text and fonts.

U.S. Pat. No. 5,491,780 describes a technique for reducing the transmission of bit-map images, by limiting the transmission and the refreshing only to the portion of screen really affected by the graphic commands of the target computer.

Anyway the above techniques, while reducing the amount of image data to be sent over the communication lines, cannot avoid the transmission of image portion usually in the form of bit maps each time the image is modified. This transmission still represents the bottleneck of the remote control programs, because of the low speed at which the bit map with the modified area can be sent through a modem or a LAN; this burden of course can be very heavy in case of a large modification which requires a large bit map.

It is an object of the present invention to provide a technique which overcomes the above drawbacks.

SUMMARY OF THE INVENTION

According to the invention we provide a method for duplicating and refreshing, on at least one destination data processing system a graphic image displayed on a source data processing system, the at least one destination data processing system comprising:
   a first display unit for displaying graphic images and
   a first display driver for modifying the image on the first display unit;
the source data processing system comprising:
   a second display unit for displaying images,
   a graphic engine for generating a plurality of graphic commands and
   a second display driver for modifying the image on the second display unit according to the graphic commands generated by the graphic engine;
the at least one destination data processing system and the source data processing system being connected through a network, the method comprising the steps of:
   intercepting the graphic commands generated by the graphic engine;
   passing the graphic command to the second display driver;
   translating a subset of the graphic commands into an operating system independent format, according to a predefined protocol;
   sending the system independent graphic commands, through the network, to the at least one destination data processing system;
   transforming the system independent graphic commands into the at least one destination data processing system format, according to said protocol;
   passing the transformed graphic commands to the first display driver.

Furthermore, according to the present invention we provide a system for duplicating and refreshing, on at least one destination data processing system a graphic image displayed on a source data processing system, the at least one destination data processing system comprising:

a first display unit for displaying graphic images and a first display driver for modifying the image on the first display unit;

the source data processing system comprising:

a second display unit for displaying images, a graphic engine for generating a plurality of graphic commands and a second display driver for modifying the image on the second display unit according to the graphic commands generated by the graphic engine;

the at least one destination data processing system and the source data processing system being connected through a network, the system comprising:

means for intercepting the graphic commands generated by the graphic engine;

communication means for passing the graphic command to the second display driver;

means for translating a subset of the graphic commands into an operating system independent format, according to a predefined protocol;

network means for sending the system independent graphic commands to the at least one destination data processing system;

means for transforming the system independent graphic commands into the at least one destination data processing system format, according to said protocol;

communication means for passing the transformed graphic commands to the first display driver.

Various embodiments of the invention will now be described in detail by way of examples, with reference to accompanying figures, where:

DETAILED DESCRIPTION OF THE PREFERRED EMBODIMENT

Figure 1:
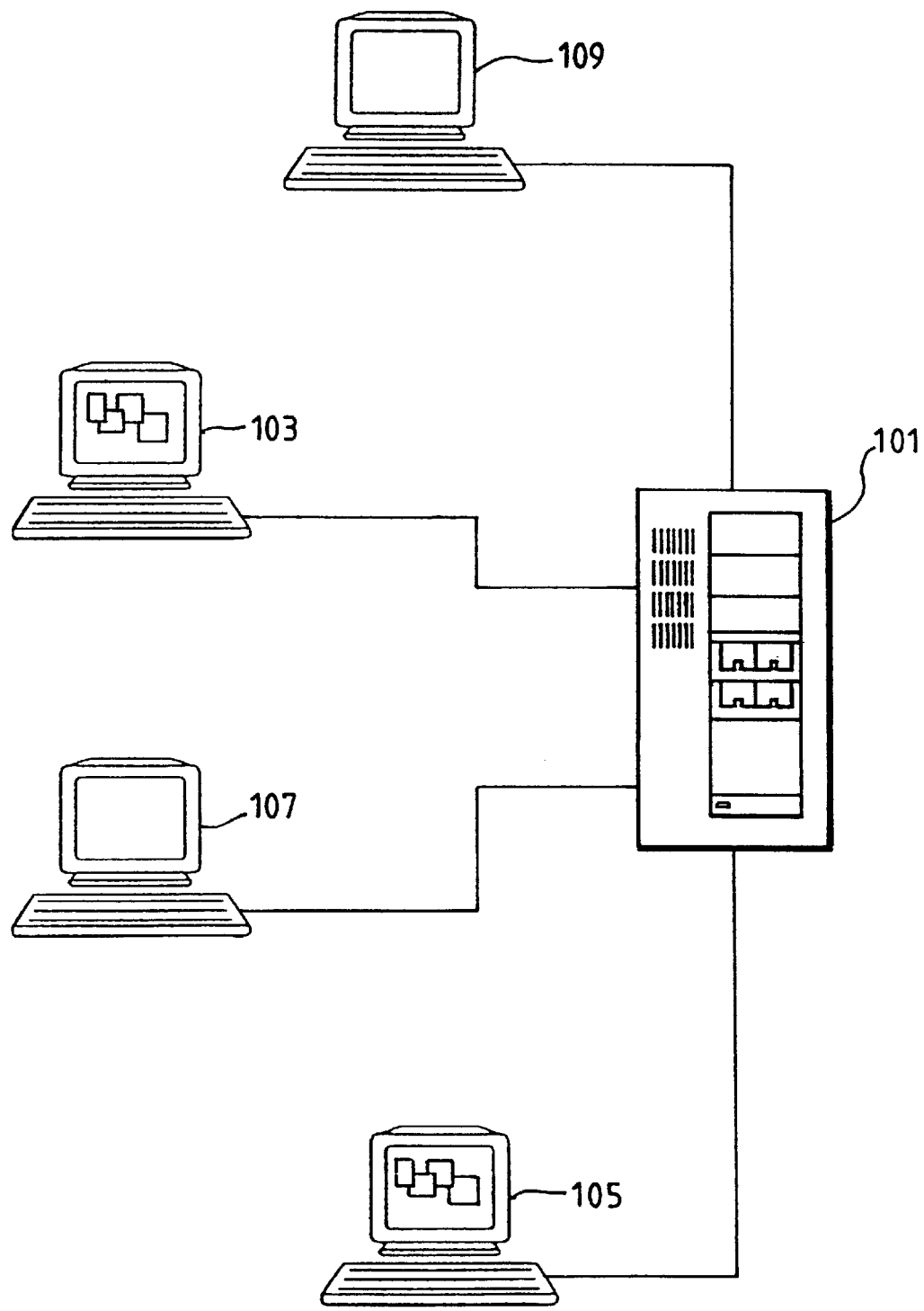
FIG. 1 shows schematically the network and the personal computers which may be utilized to implement the method and system of the present invention.

FIG. 1 illustrates an example of a typical Local Area Network (LAN) where a remote control system can be implemented. It comprises a LAN server 101 which acts as a communication bridge between two or more data processing systems. In other connection systems the function of the server would be performed, for example, by a bridge, a modem, a cable or, in general, any device that, interposed between two or more data processing system, makes them connected.

The data processing system 105 is the controller and can alternatively take the control of one of the other data processing system 103, 107 and 109.

Data processing systems 103, 105, 107 and 109 can be personal computers or workstations available on the market. They preferably include a display unit and a keyboard, coupled in a manner well known in the art.

Additionally, the data processing systems include a processor system unit which may serve to mount a fixed disk drive and a diskette drive in addition to the main processor and memory. Further, in order to facilitate the utilization of a graphical user interface, the data processing systems preferably include a graphic pointing device, such as a mouse, which may be utilized to manipulate the position of a pointer within a visual display on the screen.

Those skilled in the art will appreciate that data processing systems described above may be implemented utilizing any state-of-the-art personal computer, such as the PS/2 Personal Computer manufactured by International Business Machines Corporation. (PS/2 is a trademark of International Business Machines Corporation).

Data processing systems are usually provided with a graphical user interface (GUI) to allow a user to control the data processing system and to present the results of user actions on the system display. In a graphical user interface, applications and data are generally presented as objects depicted on a user interface. A user is then provided with a graphical, intuitive interface to a complex data processing system which permits graphic selection of depicted objects and manipulation of applications corresponding to those objects.

There are a number of different graphical user interface environments commercially available which utilize the arrangement described above. These environments include the System 7 operating system developed by Apple Computer, Inc. (System 7 is a trademark of Apple Computer, Inc.), the Windows graphical user interface developed by the Microsoft Corporation (Windows is a trademark of Microsoft Corporation) and the OS/2 Presentation Manager developed by International Business Machines Corporation (OS/2 and Presentation Manager are trademarks of International Business Machines Corporation).

The window environment is generally part of the operating system software that includes a collection of utility programs for controlling the operation of the computer system 100.

In the example shown in FIG. 1 the control is over the system 103, which is defined the target system and all the resources of system 103 can be used and activated by the controller system. For performing such control, system 105 must be able to represent on its display an exact copy of the target display 103.

Figure 2:
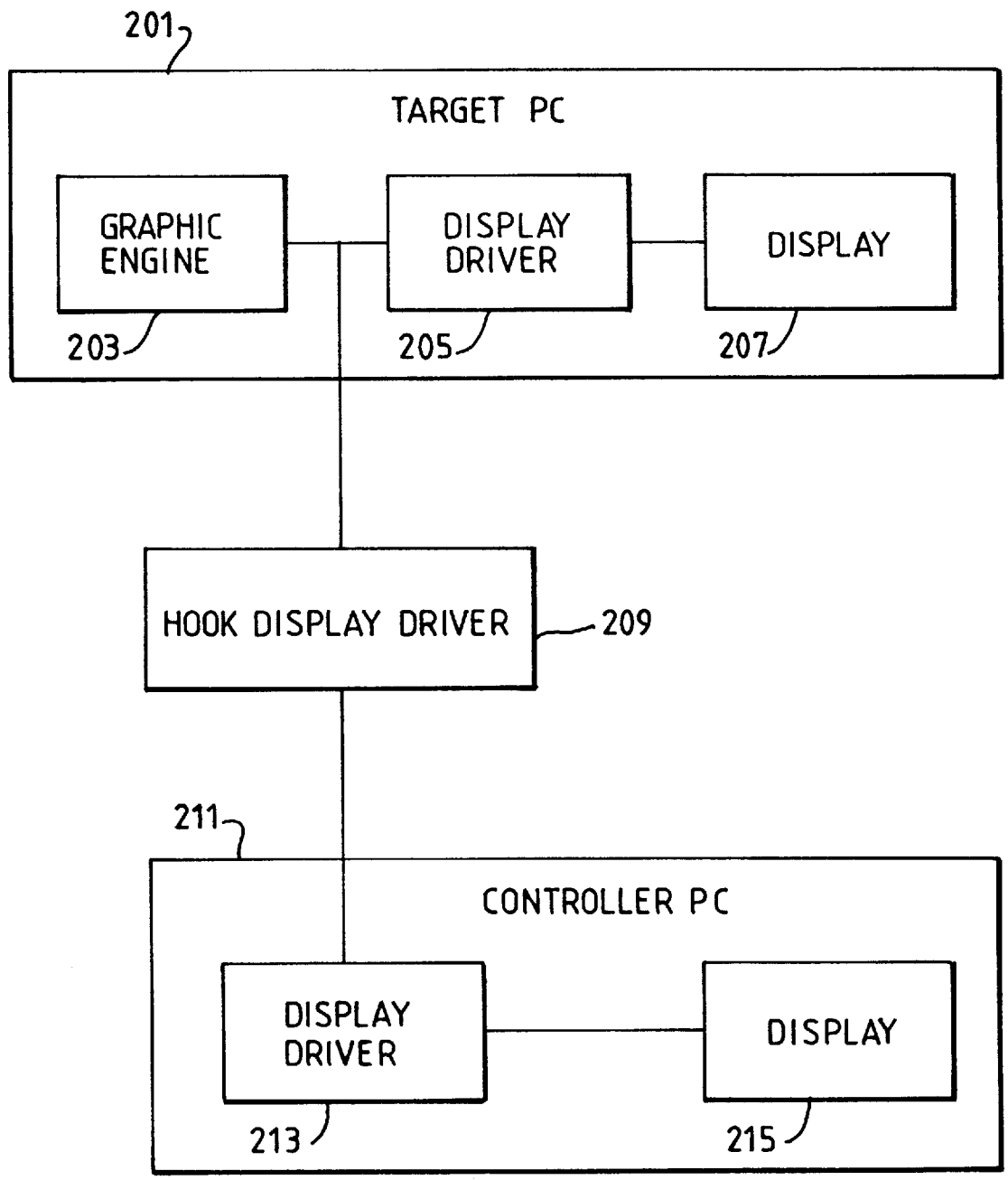
FIG. 2 shows schematically the preferred embodiment of the present invention.

With reference to FIG. 2 a preferred embodiment of the present invention is shown. Under state of the art graphical operating system, an application can display or modify images on the screen through a set of device independent APIs provided by the operating system graphic engine (203). The graphic engine (203) performs graphic operations by calling entry points in the display driver (205) that performs the appropriate operations on the driver for which the driver is written. The driver is the end point of the operation since it modifies the graphic frame buffer or the display (207) that is managed directly by the hardware.

According to the present invention another module is inserted in the system. The hook display driver (209) intercepts the calls issued by the graphic engine (203) to the display driver (205). Then the hook display driver (209) duplicates the graphic commands and send them both to the target display driver (205) and to the controller display driver (213) in order to realize a correspondence between the image displayed on the target system and on the controller system.

Obviously, this solution is much more efficient in terms of speed of transmission than the method of sending a bit map of the target image.

However, while the bit-map is a sort of "universal format" which can be understood and processed by any operating system, the transmission of a set of commands can create some problems in terms of compatibility if the operating system of the target and the controller are not identical.

To realize this compatibility, the hook display driver (209) according to the present invention, translates the graphic commands issued by the graphic engine (203) of the target computer into a system independent format using a pre-defined protocol. The system independent commands are then transmitted through the network to the controller computer, where they are re-translated in graphic commands for the display driver (213) using the same protocol.

According to a preferred embodiment of the present invention, only a subset of the graphic commands issued by the graphic engine are translated and transmitted to the controller. The reason is that a limited set of commands covers the most of the operations performed by a display driver.

The following is a definition of the constants and data structures expressed in the 'C' language as used in a preferred embodiment of the present invention:

List of constants and data structure expressed in 'C' language used in the protocol:
Command Identifier Values:

```
#define ACCM_CMD_BITBLT                    1
#define ACCM_CMD_BITBLT_SAVE               2
#define ACCM_CMD_BITBLT_HIT                3
#define ACCM_CMD_BITBLT_SRCCOPY            4
#define ACCM#CMD_SAVESCREENBITMAP_SAVE     5
#define ACCM_CMD_SAVESCREENBITMAP_RESTORE  6
#define ACCM_CMD_BITBLT_REPEAT             7
#define ACCM_CMD_TEXTOUT                   8
```
Brush field values:
```
#define DIC_                               0
BRUSH_
SOLID
#define DIC                                2
BRUSH_
HATCHED
#define DIC_BRUSH_                         3
PATTERN
#define DIC_BRUSH_SIMULATEDPATTERN         4
```
Extended Text Out field values:
```
#define ETO_OPAQUE    0x0002
#define ETO_CLIPPED   0x0004
```
Background field values:
```
#define BK_TRANSPARENT                     1
#define BK_OPAQUE                          2
```
Font identifier field values:
```
#define FONT_CQURIER                       1
#define FONT_HELV                          2
#define FONT_SYSTEM                        3
define FONT_TMSROMAN                      4 typedef struct tagDCAF_BITMAPINFOHEADER
    {
        unsigned short  usSize;
        unsigned short  usBmpwidth;
        unsigned short  usBinpHeight;
        unsigned char   bPlanes;
        unsigned char   bBitcount;
    }   DCAF_BITMAPINFOHEADER,
typedef DCAF_BITMAPINFOHEADER
        *PDCAF_BITMAPINFOHEADER;
```

-continued
```
typedef struct tagDCAF_BITMAPINFO
    {
        DCAF_BITMAPINFOHEADER dcfbmpinfoheader;
        unsigned char
bBmpBytes[MAX_BRUSH_BITMAP_SIZE];
    }   DCAF_BITMAPINFO;
typedef DCAF_BITMAPINFO   *PDCAF_BITMAPINFO;
typedef struct tagDCAF_
BRUSHINFOHEADER
    {
        short   sSize;
        short   sType;
        long    lColor;
        short   sHatch;
        long    lBkColor;
        short   usXalign;
        short   usYalign;
    }   DCAF_BRUSHINFOHEADER;
typedef DCAF_BRUSHINFOHEADER
*PDCAF_BRUSHINFOHEADER;
typedef struct tagDCAF_BRUSHINFO
    {
        DCAF_BRUSHINFOHEADER dcfbrushinfoheader;
        DCAF_BITMAPINFO   dcfbmpinfo;
    }   DCAF_BRUSHINFO;
typedef DCAF_BRUSHINFO   *PDCAF_BRUSHINFO;
typedef struct tagDCAF_BITMAPSAVER
    {
        unsigned short  usBmpSize;
        unsigned short  usWidth;
        unsigned short  usHeight;
        unsigned short  usWidthBytes;
        unsigned short  usPlanes;
        char bmp;
    }   DCAF_BITMAPSAVER;
typedef DCAF_BITMAPSAVER *PDCAF_BITMAPSAVER;
typedef struct _DCAFRECT {
        unsigned short  usRectXLeft;
        unsigned short  usRectYBottom;
        unsigned short  usRectXRight;
        unsigned short  usRectYTop;
    } DCAFRECT;
typedef DCAFRECT *PDCAFRECT;
typedef struct _ACCM_TEXTOUT {
        unsigned char   bCommandType;
        unsigned short  usCmdLength;
        unsigned short  usEtoOptions;
        char            bClipPresent;
        DCAFRECT        rectClipArea;
        char            bOpaquePresent;
        DCAFRECT        rectOpaqueArea;
        unsigned short  usDestX;
        unsigned short  usDestY;
        unsigned short  usCount;
        unsigned short  usSelHeight;
        unsigned short  usSelWidth;
        unsigned short  usPointSize;
        unsigned short  usFaceName;
        unsigned long   ulBkColor;
        unsigned long   ulTextColor;
        unsigned short  usBkMode;
        unsigned short  usWeight;
        unsigned short  usWidth;
        unsigned short  usHeight;
        char            cItalic;
        char            cUnderline;
        char            cStrikeOut;
        char            cText;
    }   ACCM_TEXTOUT;
typedef ACCM_TEXTOUT *PACCM_TEXTOUT;
typedef struct _ACCM_BITBLT_CORE {
        unsigned char   bCommandType;
        unsigned short  usCmdLength;
        unsigned short  usDestXOrigin;
        unsigned short  usDestYOrigin;
        unsigned short  usSrcXOrigin;
        unsigned short  usSrcYOrigin;
        unsigned short  usXExtension;
        unsigned short  usYExtension;
        long            lRop3;
```

```
        } ACCM_BITBLT_CORE;
typedef ACCM_BITBLT_CORE *PACCM_BITBLT_CORE;
typedef struct _ACCM_BITBLT {
        ACCM_BITBLT_CORE bmp_core;
        DCAF_BRUSHINFO      Brush;
        } ACCM_BITBLT;
typedef ACCM_BITBLT *PACCM_BITBLT;
typedef struct _ACCM_BITBLT_SAVE {
        ACCM_BITBLT_CORE bmp_core;
        unsigned char bBmpID;
        DCAF_BITMAPSAVER bmpsaver;
        } ACCM_BITBLT_SAVE;
typedef ACCM_BITBLT_SAVE *PACCM_BITBLT_SAVE;
typedef struct _ACCM_BITBLT_HIT {
        ACCM_BITBLT_CORE bmp_core;
        unsigned char bBmpID;
        } ACCM_BITBLT_HIT;
typedef ACCM_BITBLT_HIT *PACCM_BITBLT_HIT;
typedef struct _ACCM_SAVESCREENBITMAP {
        unsigned char    bCommandType;
        unsigned short   usCmdLength;
        unsigned short   usRectXLeft;
        unsigned short   usRectYBottom;
        unsigned short   usRectXRight;
        unsigned short   usRectYTop;
        }ACCM_SAVESCREENBITMAP;
typedef ACCM_SAVESCREENBITMAP
*PACCM_SAVESCREENBITMAP;
```

The information necessary to replay a graphical command are stored in a structure which contains the command identifier and the parameters used to replay the command. For example when a text is drawn the information regarding this event is stored in the structure ACCM_TEXTOUT whose first field contains the value ACCM_CMD_TEXTOUT and the other fields are used to replay the text.

The protocol described above is believed to handle most of the events that modify the display on any known operating system. For example, using the Microsoft Windows operating system the above described protocol is able to hook and replay an average of 95% of the screen changes.

Figure 3:
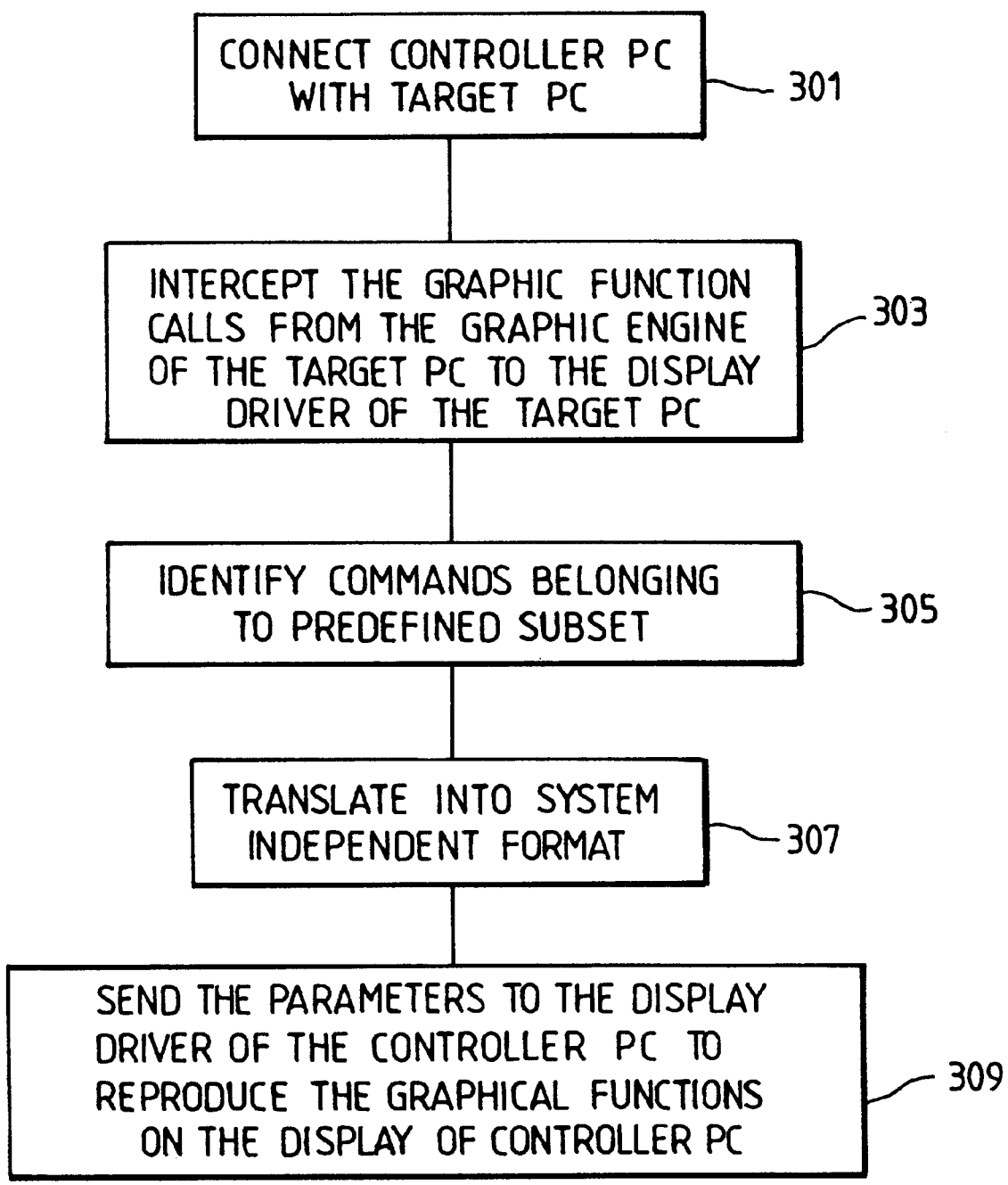
FIG. 3 shows schematically the method steps according to a preferred embodiment of the present invention.

FIG. 3 shows the steps of the method according to a preferred embodiment of the present invention. At step 301 the server 101 connects the target computer 103 with the controller computer 105. At step 303 the hook display driver 209 intercepts the graphic commands issued by the graphic engine 203 to the display driver 205. Step 305 identifies those graphic commands belonging to a predefined subset of commands and extracts the related parameters. Step 307 translates the graphic commands identified by step 305 and the related parameters into a system independent format according to the predefined protocol described above. Step 309 sends the translated commands and parameters to the display driver 213 of the controller computer, where the commands will be retranslated from the system independent format into the controller system format to be reproduced on the controller display 215.

Those skilled in the art will appreciate that a proper translation tailored on the format of each system (source or controller) must be implemented in order to realize the correspondence between two different systems and the common protocol. However, due to the limited number of commands belonging to the subset, this additional operations do not constitute a substantial overhead neither in the functioning of the system nor from the programming point of view.

According to a preferred embodiment of the present invention the complete correspondence of the controller display with the target display can be granted by sending every predetermined period of time (e.g. 5 sec.) a bit-map of the image actually displayed on the target display to "syncronize" the controller display in case of events not covered by the protocol.

To check whether the image replayed on the controller display is coincident with the target display, a "shadow" bit-map copy of the target display is maintained in the storage of the target computer. Each time a command issued by the graphic engine is translated using the protocol and transmitted to the controller computer to be re-translated and replayed, the same operation is done on the "shadow" bit-map image: the system independent commands are re-translated and operated on the "shadow" bit-map. Every predetermined period of time (5 sec. in the preferred embodiment) the "shadow" image is compared with the actual target display and if any difference is detected, the portion of the screen to be modified is transmitted in the bit-map format to the controller computer.

Figure 4:
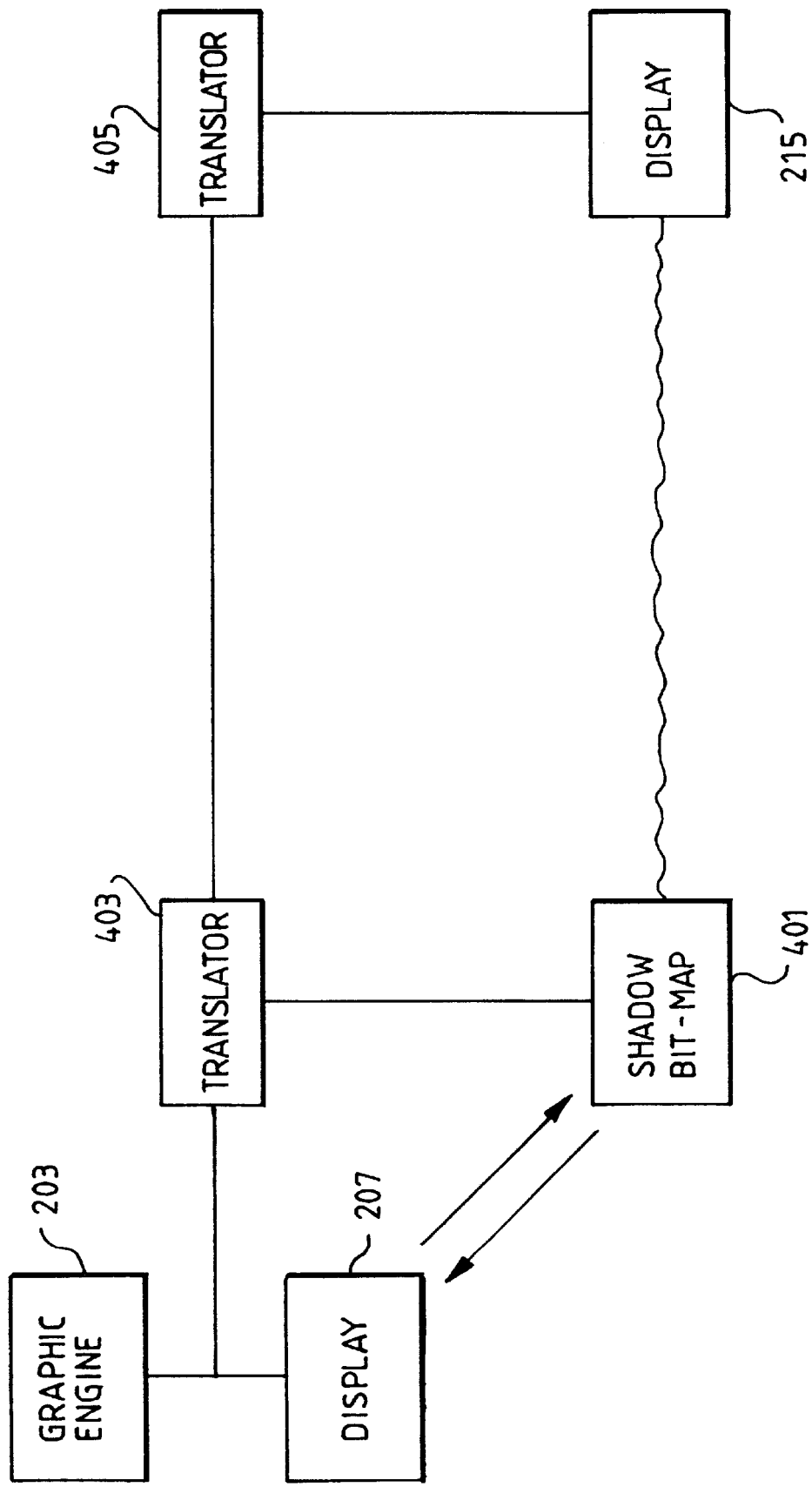
FIG. 4 shows schematically an embodiment of the present invention.

FIG. 4 shows schematically the "syncronization" mechanism: a subset of the graphic commands, issued by the graphic engine 203 to the display 207 in the target PC, is intercepted and translated by translator 403 and sent to the controller PC where they will be re-translated and reproduced on display 215. This last operation is simulated also on the "shadow bit-map" 401: in this way the target pc can always check what is actually displayed on controller display 215. Every predetermined period of time (e.g. 5 seconds) the shadow bit-map is compared with the bit-map of the display 207 and where a difference is detected a "syncronization" is performed: the bit-map is transmitted to the controller display 215 to update the displayed image and re-establish the correspondence between the two images.

The bit-map transmission, as mentioned above, is a heavy and time consuming activity, but according to the syncronization mechanism described above it is performed only once every period of time and only when actually needed. In this way the high reliability of this kind of transmission is obtained while not affecting the speed of the communications between the systems.

We claim:

1. A method for duplicating and refreshing, on at least one destination data processing system a graphic image displayed on a source data processing system, the at least one destination data processing system comprising:
   a first display unit for displaying graphic images and
   a first display driver for modifying the image on the first display unit;
the source data processing system comprising:
   a second display unit for displaying images,
   a graphic engine for generating a plurality of graphic commands and
   a second display driver for modifying the image on the second display unit according to the graphic commands generated by the graphic engine;
the at least one destination data processing system and the source data processing system being connected through a network, the method comprising the steps of:
   intercepting the graphic commands generated by the graphic engine;
   passing the graphic command to the second display driver;
   translating a subset of the graphic commands into an operating system independent format, according to a predefined protocol;
   sending the system independent graphic commands, through the network, to the at least one destination data processing system;
   transforming the system independent graphic commands into the at least one destination data processing system format, according to said protocol;

passing the transformed graphic commands to the first display driver;

copying in the storage of the source data processing system a bit-map of the image displayed on the second display unit;

modifying the copied bit-map image according to said subset of graphic commands;

comparing, every predetermined period of time, the copied bit-map image with the image displayed on the second display unit;

if the difference between the copied bit-map image and the image displayed on the second display unit exceeds a predetermined threshold, updating the bit-map image copy and sending, through the network, the bit-map image to the at least one destination data processing system.

2. A system for duplicating and refreshing, on at least one destination data processing system a graphic image displayed on a source data processing system, the at least one destination data processing system comprising:

a first display unit for displaying graphic images and a first display driver for modifying the image on the first display unit;

the source data processing system comprising:

a second display unit for displaying images, a graphic engine for generating a plurality of graphic commands and a second display driver for modifying the image on the second display unit according to the graphic commands generated by the graphic engine;

the at least one destination data processing system and the source data processing system being connected through a network, the system comprising:

means for intercepting the graphic commands generated by the graphic engine;

communication means for passing the graphic command to the second display driver;

means for translating a subset of the graphic commands into an operating system independent format, according to a predefined protocol;

network means for sending the system independent graphic commands to the at least one destination data processing system;

means for transforming the system independent graphic commands into the at least one destination data processing system format, according to said protocol;

communication means for passing the transformed graphic commands to the first display driver;

timer means for counting a predetermined period of time;

means for copying in the storage of the source data processing system a bit-map of the image displayed on the second display unit;

means for modifying the copied bit-map image according to said subset of graphic commands;

means for comparing, every predetermined period of time, the copied bit-map image with the image displayed on the second display unit and for updating the copied bit-map image if the difference exceeds a predetermined threshold;

network means for sending the bit-map image copy to the at least one destination data processing system, if the difference between the bit-map image and the image displayed on the second display unit exceeds a predetermined threshold.

3. A method for duplicating and refreshing, on at least one destination data processing system a graphic image displayed on a source data processing system, the source data processing system comprising:

a first display unit for displaying images, a graphic engine for generating a plurality of graphic commands and a first display driver for modifying the image on the first display unit according to the graphic commands generated by the graphic engine;

the at least one destination data processing system comprising:

a second display unit for displaying graphic images and a second display driver for modifying the image on the second display unit;

the method comprising the steps of:

intercepting the graphic commands generated by the graphic engine;

translating those graphic commands which belong to a predetermined subset into an operating system independent format, according to a predefined protocol;

transmitting the system independent graphic commands to the at least one destination data processing system;

transforming the system independent graphic commands into the at least one destination data processing system format, according to said protocol creating in the storage of the source data processing system a bit-map copy of the image displayed on the first display unit;

modifying the bit-map copy according to said translated graphic commands;

comparing, every predetermined period of time, the bit-map copy with the image displayed on the first display unit;

if the difference between the bit-map copy and the image displayed on the first display unit exceeds a predetermined threshold, updating the bit-map copy and transmitting the updated bit-map image to the at least one destination data processing system.

4. A system for duplicating and refreshing, on at least one destination data processing system a graphic image displayed on a source data processing system, the source data processing system comprising:

a first display unit for displaying images, a graphic engine for generating a plurality of graphic commands, and a first display driver for modifying the image on the first display unit according to the graphic commands generated by the graphic engine;

the at least one destination data processing system comprising:

a second display unit for displaying graphic images, and a second display driver for modifying the image on the first display unit;

the system comprising:

means for intercepting the graphic commands generated by the graphic engine;

means for translating those graphic commands which belong to a predetermined subset into an operating system independent format, according to a predefined protocol;

means for transmitting the system independent graphic commands to the at least one destination data processing system;

means for transforming the system independent graphic commands into the at least one destination data processing system format, according to said protocol timer means for counting a predetermined period of time;

means for creating in the storage of the source data processing system a bit-map copy of the image displayed on the first display unit;

means for modifying the bit-map copy according to said translated graphic commands;

means for comparing, every predetermined period of time, the bit-map copy with the image displayed on the first display unit and for updating the bit-map copy if the difference exceeds a predetermined threshold;

means, responsive to said predetermined threshold being exceeded, for transmitting the updated bit-map image to the at least one destination data processing system.

* * * * *